United States Patent [19]
Koga et al.

[11] Patent Number: 4,831,660
[45] Date of Patent: May 16, 1989

[54] MODE CHANGE MECHANISM FOR TAPE RECORDERS

[75] Inventors: Noriyuki Koga; Masakatsu Hosoya, both of Tokyo, Japan

[73] Assignee: Sony Corp., Tokyo, Japan

[21] Appl. No.: 117,805

[22] Filed: Nov. 6, 1987

[30] Foreign Application Priority Data

Nov. 8, 1986 [JP] Japan .................................. 61-266138

[51] Int. Cl.⁴ ............................................. G11B 15/02
[52] U.S. Cl. ........................................ 360/90; 360/137
[58] Field of Search .......................... 360/137, 96.3, 90

[56] References Cited

U.S. PATENT DOCUMENTS

| | | | |
|---|---|---|---|
| 4,399,475 | 8/1983 | Shimomae | 360/96.3 |
| 4,591,932 | 5/1986 | Aratani | 360/137 |
| 4,612,589 | 9/1986 | Sakane | 360/137 |
| 4,691,261 | 9/1987 | Hasegawa et al. | 360/137 |
| 4,720,755 | 1/1988 | Kamijo | 360/96.3 |

FOREIGN PATENT DOCUMENTS

| | | | |
|---|---|---|---|
| 3337168 | 4/1984 | Fed. Rep. of Germany | 360/137 |
| 59-30257 | 2/1984 | Japan | 360/137 |
| 59-148170 | 8/1984 | Japan | 360/137 |

*Primary Examiner*—John H. Wolff
*Assistant Examiner*—Matthew J. Bussan
*Attorney, Agent, or Firm*—Alvin Sinderbrand

[57] ABSTRACT

In a mode-change mechanism for a tape recorder, a driving bar is mounted for movement between a record/playback mode position and a stop mode position, a partially toothless gear has a cam thereon engageable by a cam follower on the driving bar for moving the latter between its mode selecting positions in response to turning of the partially toothless gear between immobile positions thereof in which opposed first and second toothless portions on the outer periphery respectively face a driving gear for intermittently rotating the partially toothless gear, a lock lever is selectively engageable with one of a pair of stop elements on the partially toothless gear for halting rotation of the latter in a respective one of the immobile positions thereof, and a spring urges the driving bar toward one of its mode selecting positions, with the cam, toothless portions and stop elements on the partially toothless gear being angularly positioned in respect to each other so that, when the lock lever is disengaged from one of the stop elements, the force of the spring on the driving bar is effective, through the action of the cam follower on the cam, to initiate turning of the partially toothless gear from its prior immobile position for meshing engagement with the driving gear.

9 Claims, 9 Drawing Sheets

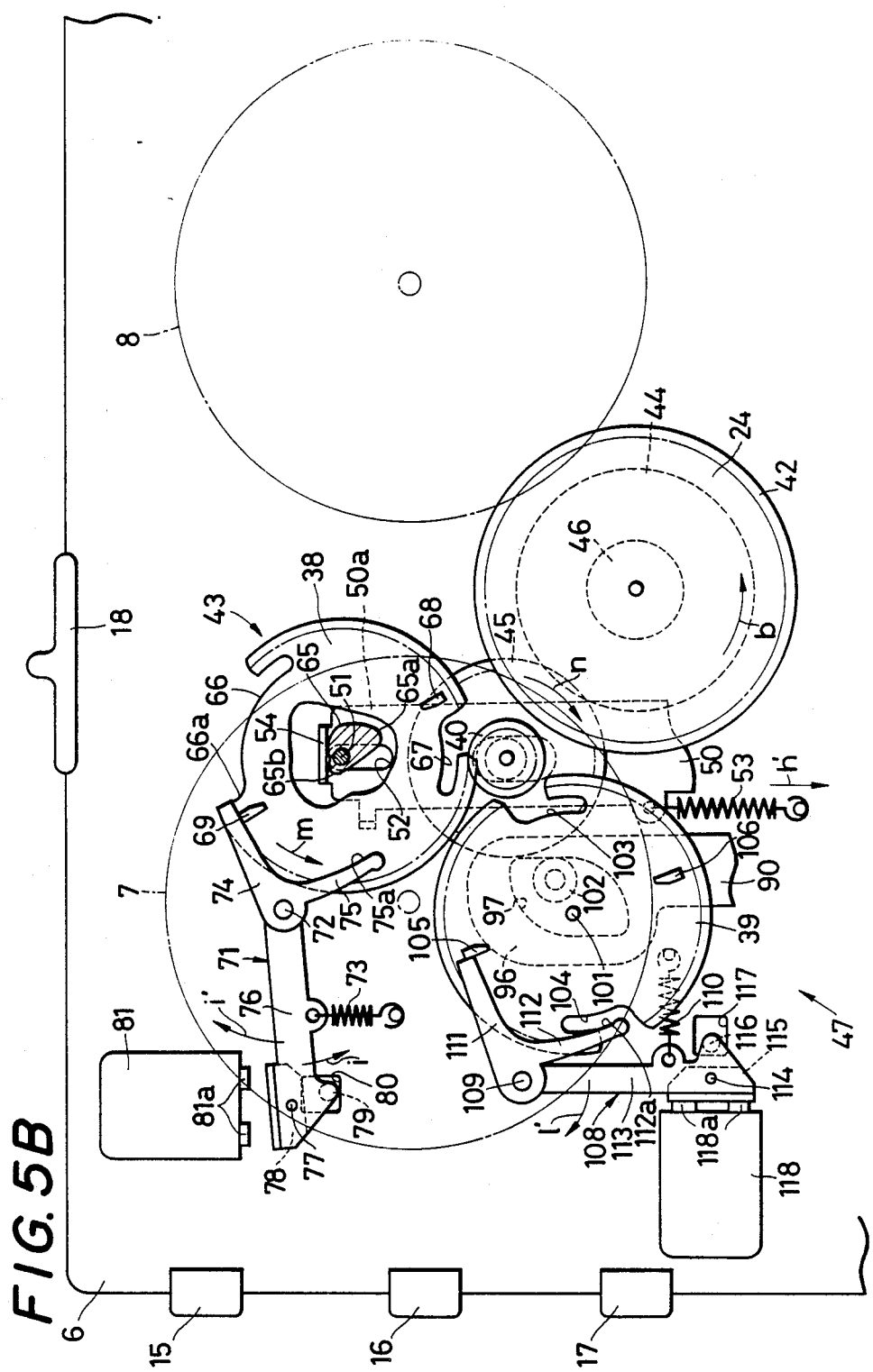

MODE CHANGE MECHANISM FOR TAPE RECORDERS

BACKGROUND OF THE INVENTION

1. Field of the Invention

This invention relates generally to a mode-change mechanism for tape recorders of the type in which the mode of operation is changed in response to intermittent turning of a partially toothless gear, and the invention is more particularly directed to a mode-change mechanism of such type suited for use in auto/reverse tape recorders.

2. Description of the Prior Art

A mode-change mechanism for a tape recorder is already known in which a driving bar is mounted for reciprocating movements between positions corresponding to a record/playback mode and a stop mode, respectively, a partially toothless gear is intermittently rotatable by a driving gear for moving the driving bar between the mentioned mode selecting positions thereof, locking means are provided for locking the partially toothless gear in an immobile position in which a toothless portion of its periphery faces the driving gear, and urging means, such as a spring, are provided for imparting an initial torque to the partially toothless gear upon release of the locking means, whereupon the partially toothless gear meshes with the driving gear so as to be intermittently rotated by the latter.

An auto-reverse tape recorder is also already known in which a partially toothless gear is intermittently rotated so as to move a change-over bar between positions thereof corresponding to a forward tape running mode and a reverse tape running mode, respectively.

An auto-reverse tape recorder is also known in which a motor rotates a driving gear which continuously drives first and second intermediate gears for intermittently rotating first and second partially toothless gears, respectively, and the intermittently rotated first and second partially toothless gears effect the necessary movements of a driving bar and a change-over bar, respectively, for selecting the record/playback mode or stop mode and for selecting the forward tape running mode or reverse tape running mode, respectively.

In the above described mode-change mechanisms in which a driving bar is displaced by the intermittent rotation of a partially toothless gear, if the release of the locking means for holding the partially toothless gear in an immobile position is actuated by a solenoid or the like, the change-over between the record/playback mode and the stop mode can be effected in response to the manipulation of a so-called "feather touch" button, which is a desirable operating characteristic. However, in the described mode-change mechanisms, the partially toothless gear must be surely meshed with the respective driving gear as soon as the locking means is disengaged or released, and a mechanism including springs and the like is provided exclusively for the purpose of effecting such initial meshing engagement of the partially toothless gear with the respective driving gear. As a result of the foregoing, the number of parts and the steps required for the assembly of the mode-change mechanism are undesirably increased with a consequent rise in the complexity and cost of production. Further, difficulties are encountered in making compact the mechanism by which the partially toothless gear is initially urged into meshing engagement with the respective driving gear, with the result that desirable miniaturizing of the tape recorders provided with such mode-change mechanisms is prevented.

Moreover, the above described known mode-change mechanisms are susceptible to malfunctions upon change-over from the record or playback mode to a fast-forward or rewind mode. More particularly, in a tape recorder having a mode-change mechanism in which the driving bar is mechanically moved to a forward or record/playback mode position in response to actuation of a record/playback button, and the driving bar is moved backward to a stop mode position upon the actuation of a fast-forward/rewind button, if the movements of the driving bar in both the forward and backward directions occur in response to the driving of the partially toothless gear by the respective driving gear, the driving bar is only gradually accelerated during its movement in the backward direction as the partially toothless gear is rotated by the driving gear. Thus, a substantially instantaneous complete change-over from the playback or record mode to the fast-forward or rewind mode is not attained. Therefore, a pinch roller may still be pressed against a respective capstan at a time when the fast-forward or rewind mode is otherwise established with the result that the magnetic tape will be damaged. Further, by reason of the relatively slow backward movement of the driving bar upon actuation of the fast-forward/rewind button, a gear train provided for effecting rotation of a reel base at a speed characteristic of the playback or record mode may be engaged or driven simultaneously with a gear train provided for rotating the same reel base at a speed characteristic of the fast-forward or rewind mode, thereby causing either damage to the mechanism or otherwise interfering with the desired operation of the tape recorder.

Moreover, in the above described mode-change mechanism for a tape recorder in which the driving bar for changing-over between the record/playback mode and the stop mode and the change-over bar for changing between the forward and reverse tape running modes are driven by first and second partially toothless gears, respectively, and first and second intermediate gears are independently associated with the first and second partially toothless gears, respectively, so as to provide for the independent intermittent driving of the latter, it is apparent that the number of parts required for the mode-change mechanism is increased and the construction thereof is complicated. As a result of the foregoing, it is difficult to miniaturize a tape recorder embodying such mode-change mechanism.

OBJECTS AND SUMMARY OF THE INVENTION

Accordingly, it is an object of the present invention to provide a mode-change mechanism for tape recorders which avoids the above described problems associated with the prior art.

More specifically, it is an object of the present invention to provide a mode-change mechanism for a tape recorder of the type having a driving bar moved between first and second positions corresponding to respective modes of the tape recorder, for example, the record/playback mode and the stop mode, respectively, in response to intermittent rotation of a partially toothless gear which is adapted to be locked in immobile positions corresponding to the first and second positions, respectively, of the driving bar and in which, upon unlocking of the partially toothless gear, an initial mechanical torque is imparted thereto for initiating turning of the partially toothless gear into meshing engagement with a rotated driving gear, and wherein such initial mechanical torque is imparted without the need for providing any springs or similar urging means exclusively for performing that function.

It is another object of this invention to provide a mode-change mechanism for a tape recorder, as aforesaid, in which, even though the driving bar is displaced in response to turning of a respective partially toothless gear, the driving bar is substantially instantaneously displaced from its position for the record/playback mode to its position for the stop mode upon the unlocking of the partially toothless gear.

A further object of the invention is to provide a mode-change mechanism or a tape recorder in which first and second partially toothless gears having different functions, for example, for effecting displacements of a driving bar between positions corresponding to the record/playback mode and stop mode, and for effecting displacements of a change-over bar between positions corresponding to a forward tape running mode and a reverse tape running mode respectively, are driven intermittently and independently of each other by a common driving gear intermediate the first and second partially toothless gears so as to permit the accommodation of the gears in a very small space.

In accordance with one aspect of this invention, a mode-change mechanism for a tape recorder comprises a driving bar mounted on a chassis for movement between first and second positions; a partially toothless gear rotatable on the chassis and having first and second toothless portions spaced apart on the outer periphery, a cam rotatable with the partially toothless gear and including first and second projections engageable by a cam follower on the driving bar for moving the latter between its first and second positions in response to turning of the partially toothless gear, and first and second stop elements spaced apart on the partially toothless gear; a driving gear for intermittently rotating the partially toothless gear; a lock lever selectively engageable with one of the first and second stop elements on the partially toothless gear when the latter is rotationally disposed with the first or second toothless portion, respectively, facing the driving gear so as to halt rotation of the partially toothless gear in a respective immobile position thereof; a solenoid energizeable for disengaging the lock lever from the selected one of the stop elements; and urging means for urging the driving bar toward one of its first and second positions and thereby pressing the cam follower against the cam; with the first and second projections of the cam, the first and second toothless portions of the partially toothless gear and the first and second stop elements thereon being angularly positioned in respect to each other so that, when the solenoid is energized t disengage the lock lever from one of the stop elements, the pressing of the cam follower against one of the first and second projections of the cam by the force of the urging means is effective to initiate turning of the partially toothless gear from the respective immobile position thereof for meshing engagement with the driving gear.

In accordance with another aspect of this invention, in a mode-change mechanism for a tape recorder, as aforesaid, and in which the first and second positions of the driving bar correspond to a record/playback mode and a stop mode, respectively, of the tape recorder, the first toothless portion faces the driving gear in correspondence to the first position of the driving bar and has a length substantially greater than the length of the second toothless portion, and the first stop element is positioned so that, when the latter is engaged by the lock lever, an end of the first toothless portion is adjacent the driving gear. By reason of the foregoing relationship, when the lock lever is disengaged or released from the first stop element, the urging means is free to effect substantially instantaneous movement of the driving bar to its second position while the respective partially toothless gear turns freely through the angular extent of the first toothless portion before coming into meshing engagement with the driving gear.

In accordance with still another aspect of this invention, a tape recorder having a pair of reel bases rotatably mounted on a chassis and a drive motor is provided with a mode-change mechanism which comprises power transmission means for selectively transmitting torques from the motor to either of the reel bases and including a group of driving gears; a group of intermediate gears driven by the group of driving gears; a driving bar mounted on the chassis for movements between a record/playback mode position and a stop mode position; a first mode control gear intermittently driven by the group of intermediate gears for effecting movements of the driving bar between its record/playback and stop mode positions; a change-over bar mounted on the chassis for movements between a forward tape running mode position and a reverse tape running mode position; and a second mode control gear intermittently driven by the group of intermediate gears for effecting movements of the change-over bar between its forward and reverse tape running mode positions; with the group of driving gears and the first and second mode control gears being substantially equally spaced from each other and in surrounding relation to the group of intermediate gears so that all of such gears can be accommodated in a very small space.

The above, and other objects, features and advantages of the invention, will be apparent in the following detailed description of a preferred illustrative embodiment thereof which is to be read in connection with the accompanying drawings wherein the same references numerals are employed to identify the corresponding parts on the several views.

BRIEF DESCRIPTION OF THE DRAWINGS

FIGS. 5A to 5E are bottom plan views of the mode-change mechanism of FIG. 1 shown in various phases of the operation thereof and to which reference will be made in explaining such operation.

DETAILED DESCRIPTION OF A PREFERRED EMBODIMENT

Figure 2:
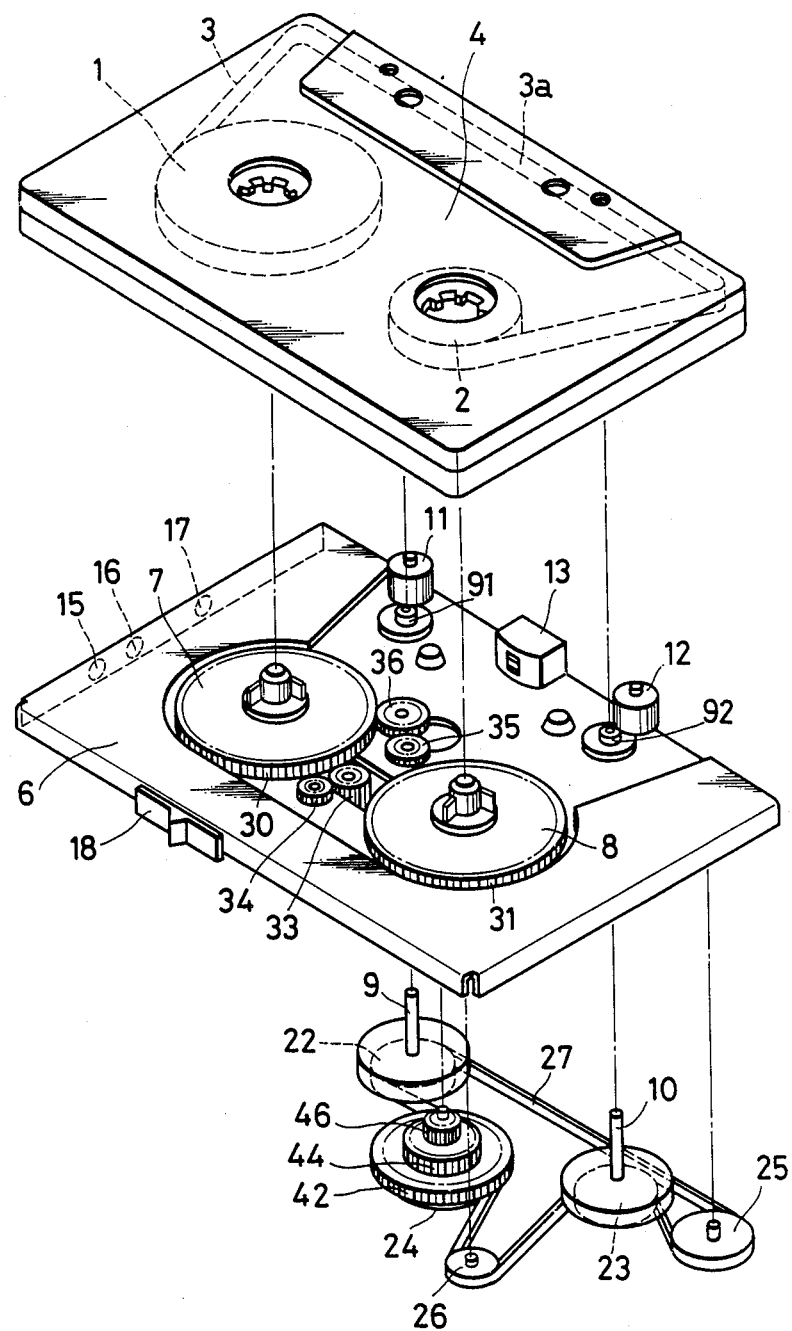
FIG. 2 is an exploded, perspective view of a tape recorder adapted to be provided with the mode-change mechanism of FIG. 1, and particularly showing the tape driving system thereof.

Referring to the drawings in detail, and initially to FIG. 2 thereof, it will be seen that a small-sized auto-reverse tape recorder in which a mode-change mechanism according to this invention is desirably embodied is intended for use with a so-called compact cassette having a cassette casing 4 which accommodates a magnetic tape 3 wound on a pair of reel hubs 1 and 2, and which is adapted to be horizontally mounted on top of a chassis 6 of the tape recorder. At the upper side of the chassis 6 there are rotatably mounted a pair of reel bases 7 and 8 respectively engageable with the reel hubs 1 and 2, and capstans 9 and 10 which extend upwardly through bearings 91 and 92 on chassis 6 so as to project into the cassette casing 4 in back of a run 3a of the tape 3 extending between the tape wound on reel hubs 1 and 2. Pinch rollers 11 and 12 are conventionally mounted on top of the chassis 6 adjacent the capstans 9 and 10, respectively, and are independently movable from respective inoperative positions through windows (not shown) in the periphery of the cassette casing 4 for pressing the tape run 3a against one or the other of the capstans 9 and 10. The tape recorder is further shown to have a record/playback magnetic head 13 conventionally mounted on top of chassis 6 for movements between an inoperative position and an operative position in which the head 13 projects through a central window in the periphery of the cassette casing 4 for engagement with the tape run 3a in the latter when the tape recorder is in a record or playback mode.

At one side of the chassis 6 there are provided a playback button 15, a stop button 16 and a forward run/reverse run button 17 which are all preferably feather-touch push buttons, and a fast-forward/rewind switch 18 is provided at the front of the chassis.

Figure 3:
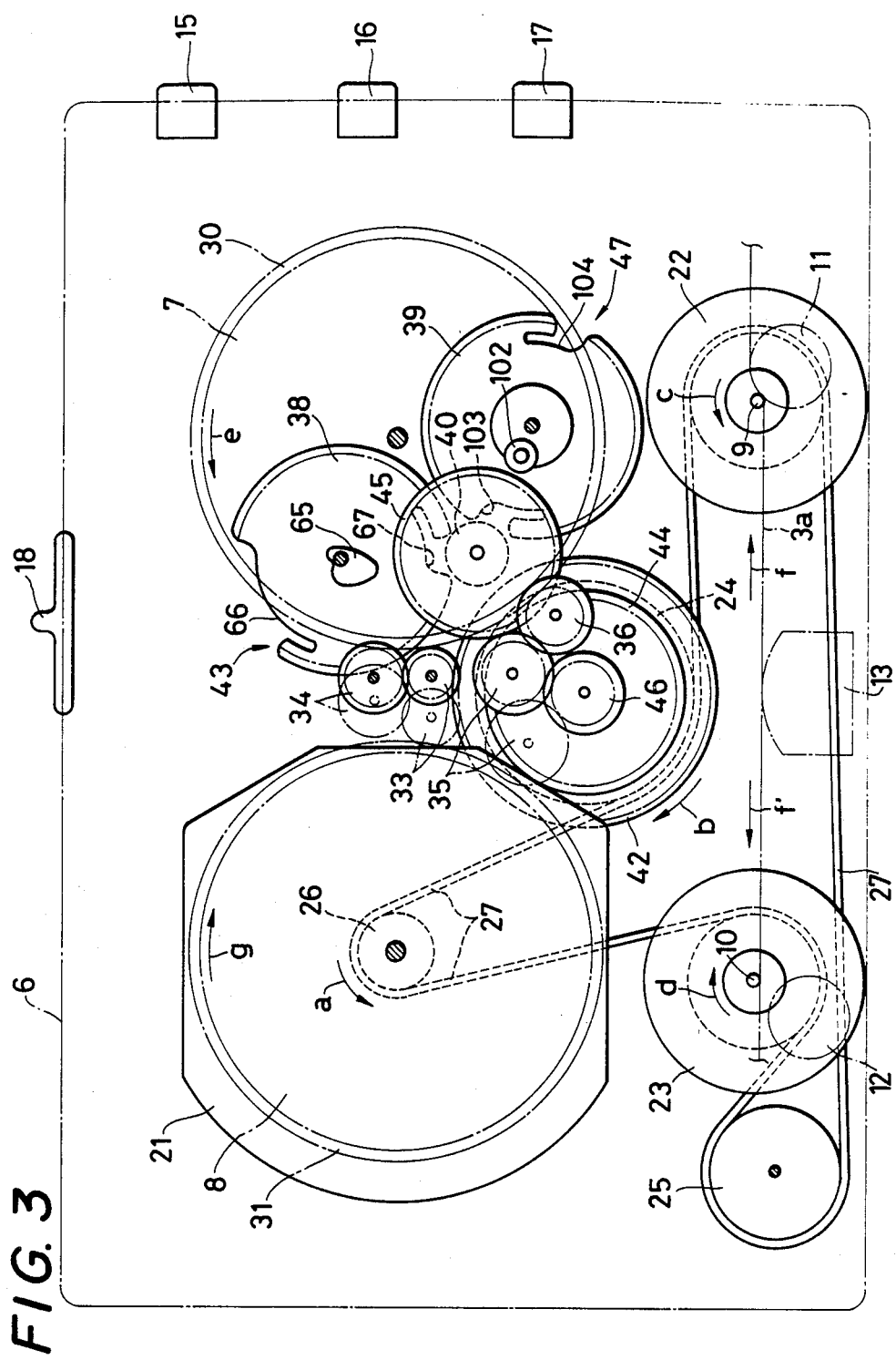
FIG. 3 is a plan view of the tape driving system of FIG. 2, and showing the association thereof with the mode-change mechanism embodying the invention.

At the underside of the chassis 6, a thin flat motor 21 is mounted substantially coaxially with respect to the reel base 8 (FIG. 3), and capstan pulleys 22 and 23 are secured to the lowered ends of the capstans 9 and 10, respectively, and also function as fly wheels (FIGS. 2 and 3). A driven pulley 24 isrrotatably mounted under the chassis 6 approximately midway between the axes of the reel bases 7 and 8, and an idle pulley 25 is rotatably mounted at the underside of the chassis 6 at the outer side of the capstan pulley 23. An elastic drive belt 27 extends around a driving pulley 26 secured to the lower end of the shaft of motor 21, and around the pulleys 22, 23, 24 and 25 so that, in response to the rotation of the motor shaft in the direction of the arrow a on FIG. 3, the driven pulley 24 and the capstan pulleys 22 and 23 are rotated in the directions of the arrows b, c and d, respectively.

Gears 30 and 31 are formed on the peripheries of the reel bases 7 and 8, respectively, and a fast-forward or rewind mode selecting gear unit which includes gears 33 and 34 in meshing engagement with each other is laterally movable between reel base gears 30 and 31. The gears 33 and 34 are suitably mounted for movement, as a unit, from a neutral position (not shown) in which gears 33 and 34 are positioned midway between reel base gears 30 and 31 and free of both of the latter, to either the position shown in full lines on FIG. 3, in which gear 34 meshes with reel base gear 30 on reel base 7, or to the position shown in dot-dash lines on FIG. 3, in which gear 33 meshes with reel base 31 on reel base 8. Also disposed between the reel bases 7 and 8 are an idle gear 35 and an intermediate gear 36 which is suitably mounted for continuous engagement with the reel base gear 30, as shown on FIG. 3, while the gear 35 is mounted for movement, as hereinafter described in detail, between the position shown in full lines where gear 35 meshes with gear 36 for driving reel base 7 through the meshing gears 36 and 30, and the position shown in dot-dash lines on FIG. 3, in which gear 35 meshes directly with reel base gear 31 for driving the respective reel base 8.

At the underside of the chassis 6 there are provided first and second mode control gears 38 and 39 which are partially toothless, as hereinafter described in greater detail, and which are respectively employed for controlling the changeover of the tape recorder between a record/playback mode and a stop mode, and between a forward tape running mode and a reverse tape running mode. A driving gear 40 for intermittently rotating the partially toothless gears 38 and 39, as hereinafter described in detail, is rotatably mounted at the underside of the chassis 6 between the gears 38 and 39.

When either the playback button 15 or the fast-forward/rewind switch 18 is actuated, a power switch (not shown) is closed so that the motor 21 is energized for rotating its shaft at a constant speed in the direction of the arrow a on FIG. 3. The resulting rotation of the driving pulley 24 in the direction of the arrow b causes similar rotations of a driving gear 42 which is coaxially integral with the pulley 24, an which meshes continuously with the gear 33 for driving the latter.

If the switch 18 is displaced in the lateral direction for selecting the fast-forward mode, a conventional fast-forward/rewind mechanism (not shown) causes gears 33 and 34 to be displaced, as a unit, from their neutral position to the position shown in full lines on FIG. 3, and in which gear 34 meshing continuously with gear 33 is brought into meshing engagement with reel base gear 30 so that the reel base 7 is rotated at high speed in the direction of the arrow e through the train of gears constituted by the gears 42, 33, 34 and 30 meshing in the order enumerated. As a result of the foregoing, the magnetic tape in the run 3a is driven at high speed in the direction of the arrow f and is wound on the reel hub 1 in the fast-forward mode.

On the other hand, if the switch 18 is displaced laterally in the other direction for selecting the rewind mode, gears 33 and 34 are displaced, as a unit, to the position shown in dot-dash lines on FIG. 3 with the result that gear 33, while continuing to mesh with driving gear 42, comes into direct meshing engagement with reel base gear 31 so that the reel base 8 is rotated at high speed in the direction of the arrow g and, as a result thereof, the magnetic tape in the run 3a is driven at a high speed in the direction of the arrow f' and is wound on the reel hub 2 in the rewind mode. If the switch 18 is returned to a neutral or centered position at any time when the tape recorder is in either its fast-forward mode or rewind mode, that fact is detected and causes the gears 33 and 34 to be returned, as a unit, to the neutral position thereof in which gears 33 and 34 are out of engagement with both reel base gears 30 and 31, thereby to return the tape recorder to its stop mode.

A driving gear 44 (FIG. 3) is also formed coaxially and integrally with the driven pulley 24 and meshes continuously with an intermediate gear 45 which is formed coaxially and integrally with the driving gear 40 for rotating the latter.

Another driving gear 46 is arranged coaxially with the driven pulley 24 and is rotationally coupled with the latter through a torque limiter (not shown) so as to be normally rotated with the driven pulley 24 in the direction of the arrow b (FIG. 3). The previously mentioned idle gear 35 is always in meshing engagement with the driving gear 46 and as earlier mentioned, is selectively movable between the positions shown in full lines and in dot-dash lines on FIG. 3 as hereinafter described in detail so as to either drive reel base 7 in the direction of the arrow e through engagement of idle gear 35 with the intermediate gear 36 which, in turn, meshes with the reel base gear 30, or to drive the reel base 8 in the direction of the arrow g through meshing engagement of the idle gear 35 directly with the reel base gear 31.

The first and second partially toothless gears 38 and 39 are respectively included in a mode selecting mechanism 43 for selecting either a record/playback mode or a stop mode, and in a mode selecting mechanism 47 for selecting either a forward tape running direction or a reverse tape running direction when the tape recorder is in its record/playback mode.

Figure 4:
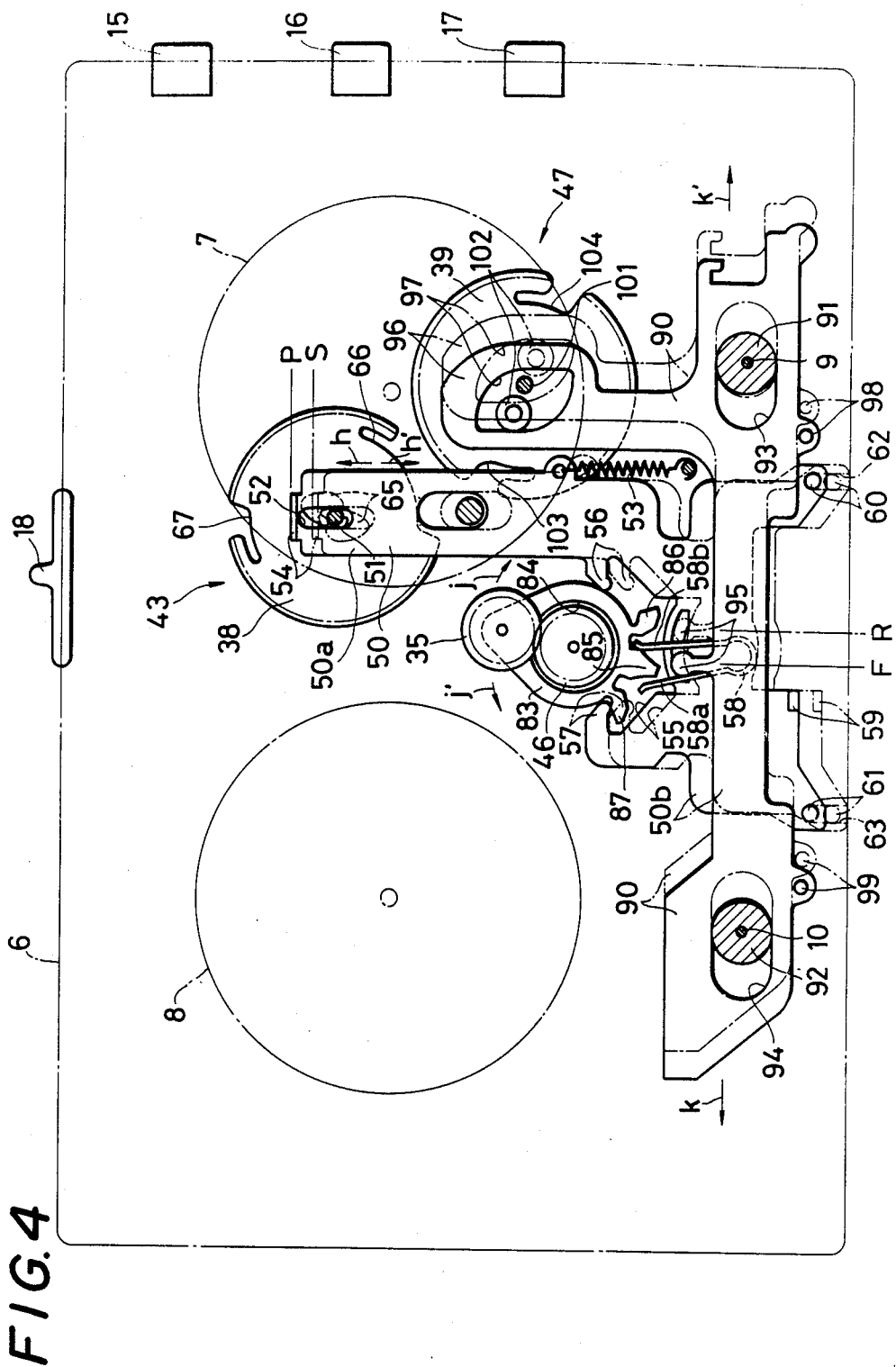
FIG. 4 is a plan view of the remainder of the mode-change mechanism shown on FIG. 1 for effecting change-over between the record/playback mode and the stop mode and between the forward tape running mode and the reverse tape running mode.

Referring now to FIG. 4, it will be seen that the mode selecting mechanism 43 for selecting either the record/playback mode or the stop mode includes a driving bar 50 which is approximately L-shaped and has an elongated leg portion 50a extending in the fore-aft direction under the chassis 6 with a shaft 51 on which the gear 38 is rotatably mounted being loosely received in an elongated hole 52 in leg portion 50a for guiding the driving bar 50 in its movements in the directions of the arrow h and h'. A tension spring 53 is connected at one end to the leg portion 50a of driving bar 50 and, at its other end, to an anchor on chassis 6 for urging driving bar 50 in the direction of the arrow h'. A cam follower, in the form of a flange 54, is provided at the forward or free end of leg portion 50a. The other end of leg portion 50a is integrally joined to a foot portion 50b extending laterally toward one side in back of the axis of the gear 46. The foot portion 50b of the L-shaped driving bar 50 is formed, at its front side, with a recess 55 which is symmetrical about a plane extending through the axis of the gear 46, and projections 56 and 57 extend laterally toward each other into the recess 55 from the opposite sides of the mouth thereof. A substantially hairpin-shaped wire member 58 is pivoted at its bight portion, to the foot portion 50b of the driving bar 50 and has resilient legs 58a and 58b extending forwardly into the central portion of the recess 55.

A lug 59 projects upwardly from a central part of the foot portion 50b near the back edge thereof and is adapted to engage with a conventional mechanism by which the magnetic head 13 is moved between its operative and inoperative positions in response to movements of the driving bar 50 in the directions of the arrows h and h', respectively, as hereinafter described in detail. Further, pins 60 and 61 project upwardly from the opposite ends of the foot portion 50b of driving bar 50 and are slidably received in grooves 61 and 62, respectively, formed in the chassis 6 for further guiding the movements of the driving bar 50 relative to the chassis in the directions of the arrows h and h'. The pins 60 and 61 further conventionally cooperate with supports for the pinch rollers 11 and 12, respectively, so that such pinch rollers are disposed to be selectively pressed against the capstans 9 and 10, respectively, only when the driving bar 50 is in a position corresponding to the record/playback mode of the tape recorder.

Figure 5A:
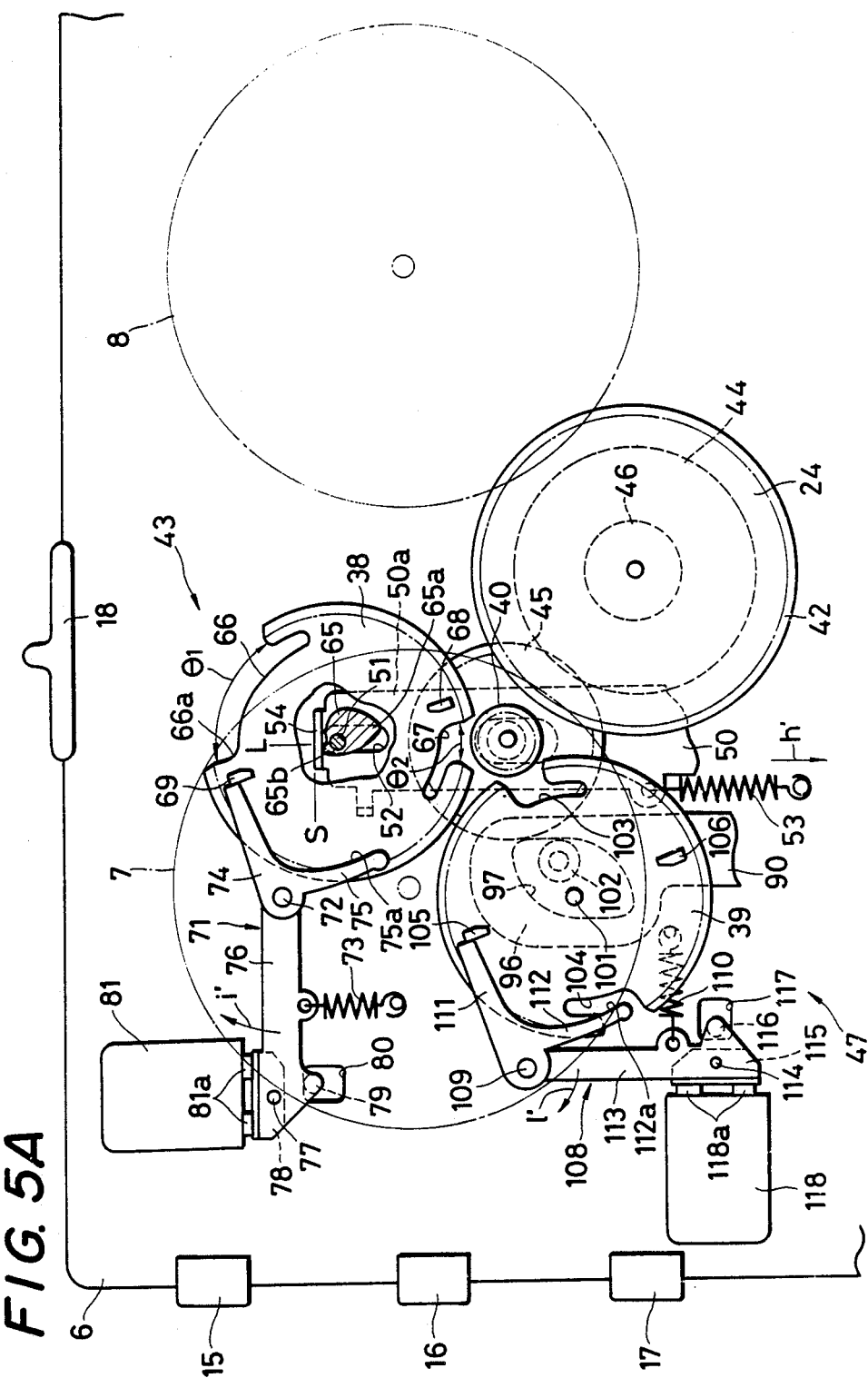

As shown in FIG. 4, the first partially toothless gear 38 is rotatable on the shaft 51 under the forward end portion of the leg portion 50a of the driving bar 50. A cam 65 is formed integrally on the central portion of the upper side of the gear 68 and is contacted, at its periphery by the cam follower or flange 54 of the driving bar 50 (FIG. 5A). The cam 65 has first and second nodes or radial projections 65a and 65b which are approximately diametrically opposed in respect to the axis of the gear 38, and which extend relatively large and small radial distances, respectively, from such axis. The outer periphery of the gear 38 has a first toothless portion 66 which faces or confronts the driving gear 40 for establishing the record/playback mode of the tape recorder, and the outer periphery of the gear 38 is further provided with a second toothless portion 67 which is positioned in substantially diametrical opposition to the toothless portion 66, and which confronts or faces the driving gear 40 for establishing the stop mode of the tape recorder. As shown particularly on FIG. 5A the first toothless portion 66 of gear 38 has an annular extent $_1$ that is substantially larger than the angular extent $_2$ of the second toothless portion 67. Further, diametrically opposed stop elements or pawls 68 and 69 are directed downwardly from the underside of the gear 38 near the leading ends of the toothless portions 67 and 66, respectively.

Figure 5C:
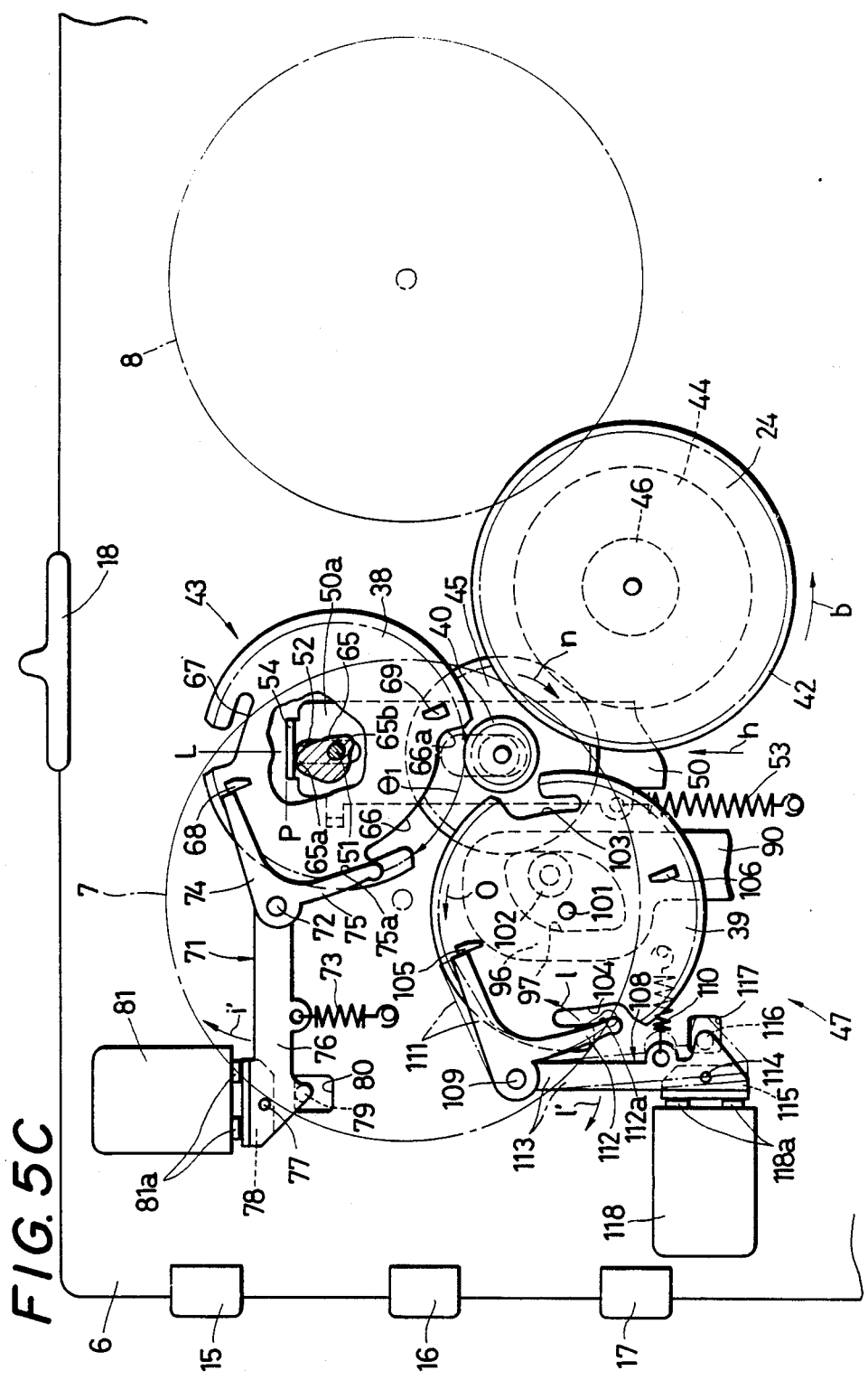

The stop elements 68 and 69 are selectively engageable by a lock lever 71 for rotationally positioning the gear 38 with its toothless portions 66 and 67 confronting the driving gear 40, for example, as shown in FIG. 5C and in FIG. 5A, respectively. The lock lever 71 is shown to be pivoted, intermediate its ends, on a pin 72 depending from the chassis 6 and is urged in the direction of the arrow i on FIG. 5B by means of a spring 73 connected between lock lever 71 and an anchor on the chassis. The lock lever 71 is desirably molded of a synthetic resin and is approximately Y-shaped so as to include a locking arm 74 and a resilient curved arm 75 branching from the axis of the pivot pin 72 at one side of the latter, and a leg 76 at the opposite side of the pivot pin. The free end portion of the leg 76 carries a pin 77 by which an armature 78 is pivotally secured thereto, and a stop pin 79 projects from the free end portion of the leg 76 and is loosely received in a hole 80 formed in the chassis 6 for limiting the angular movements of the lock lever 71. A solenoid 81 is mounted under the chassis 6 and is provided with a permanent core magnet 81a that attracts the armature 78 with a force exceeding that of the spring 73 so as to urge lock lever 71 in the direction of the arrow i' to the position shown on FIG. 5A so long as the solenoid is deenergized. In such position of the lock lever 71, the lock arm 74 thereof projects into the circular path of movement of the stop element 68 or 69 for holding the gear 38 a in respective immobile position, as shown on FIGS. 5A and 5C.

Upon the momentary energizing of the solenoid 81, the attraction of its permanent magnet core 81a for the armature 78 is overcome by the electromagnetically produced field so that the spring 73 can then angularly displace lock lever 71 in the direction of the arrow i to the position shown on FIG. 5B in which the stop pin 79 engages an edge of the hole 80, and further in which the end of the lock arm 74 is displaced outwardly from the axis of the gear 38 for disengaging the end of arm 74 from the stop element 68 or 69. The resilient curved arm 75 of the lock lever 71 is shaped so that, when the lock lever 71 is in its released or disengaged position shown on FIG. 5B, 5D or 5E, the curving edge 75a of arm 75 extends across the circular path of travel of stop elements 68 and 69 with the gear 38. Thus, in the course of the rotation of the gear 38 in the direction of the arrow m on FIGS. 5B, 5D and 5E, the stop element 69 or 68 which has been disengaged from the stop arm 74 moves against the curved edge 75a of arm 75 and angularly displaces the lock lever 71 in the direction of the arrow i' so as to return the armature 78 to the vicinity of the permanent magnet core 81a of the solenoid 81 which is by then deenergized so that the lock lever 71 can be retained by the core magnet 81a in its operative position in which the end of the stop arm 74 is engageable by the stop element 68 or 69.

As shown on FIGS. 5A and 5C, a diametrical line extending through the axis of the shaft 51 to the nodes 65a and 65b of the cam 65 is at an angle in respect to a straight line L passing through shaft 51 parallel to the deviation of movement of the leg portion 50a of the driving bar 50 when the gear 38 is positioned by the engagement of stop arm 74 with stop element 69, as on FIG. 5A, and also when the gear 38 is positioned by the engagement of stop arm 74 with stop element 68, as on FIG. 5C. Thus, when the gear 38 is in its immobile position shown on FIG. 5A in which its toothless portion 67 faces the driving gear 40 and its stop element 69 is engaged by stop arm 74, the point of contact of the cam follower 54 on driving bar 50 with the node 65b of the cam 65 is displaced laterally in respect to the axis of the shaft 51 so that the force of the spring 53 urging the driving bar in the direction of the arrow h' results in the application to the gear 38 of a torque which urges such gear to turn in the counter-clockwise direction, as viewed on FIG. 5A. Accordingly, as soon as arm 74 of the lock lever 71 is released from the stop element 69, such torque exerted on the gear 38 as a result of the force of the spring 53 initiates turning of the gear 38 in the direction of the arrow m on FIG. 5B so as to bring the peripheral teeth following the toothless portion or gap 67 of the gear 38 into meshing engagement with the driving gear 40.

It is to be understood that, when the gear 38 is in the position shown o FIG. 5A so as to engage the relatively small node 65b of the cam 65 with the cam follower 54, the spring 53 is effective to move the driving bar 50 to the position indicated at S which corresponds to the stop mode of the tape recorder. In other words, when the driving bar 59 is in its position S, the lug 59 thereon disposes the magnetic head 13 in its inoperative position spaced from the tape run 3a within the cassette housing 4, and the pins 60 and 61 position the supports for the pinch rollers 11 and 12 so as to maintain the latter in spaced relation to the respective capstans 9 and 10. Furthermore, as will hereinafter appear, when the driving bar 50 is in the position indicated at S, the idle gear 35 is maintained by driving bar 50 in a neutral position disengaged from intermediate gear 36 and from the reel base gear 31 so that neither of the reel bases 7 and 8 is rotated.

Figure 5D:
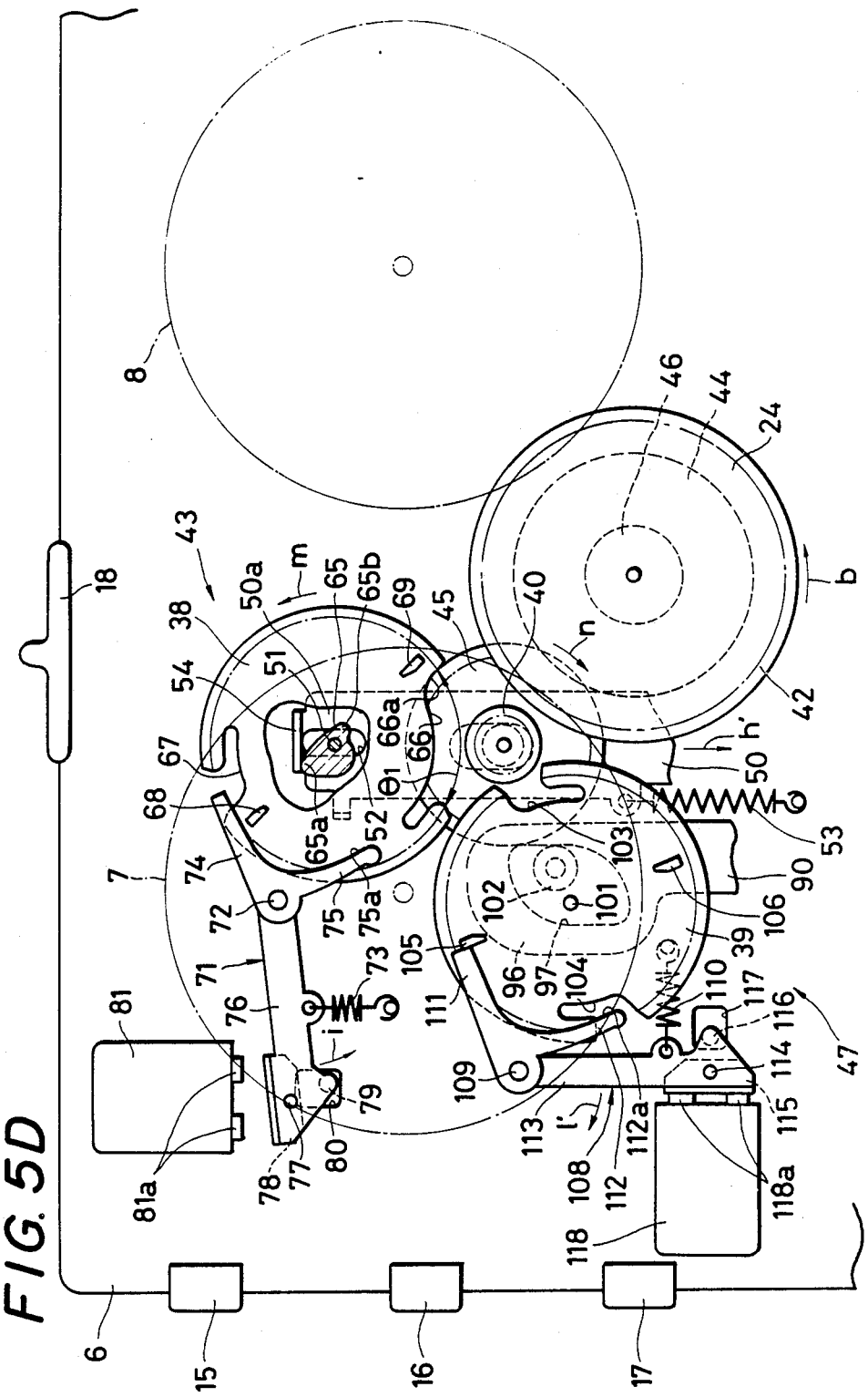
Figure 5E:
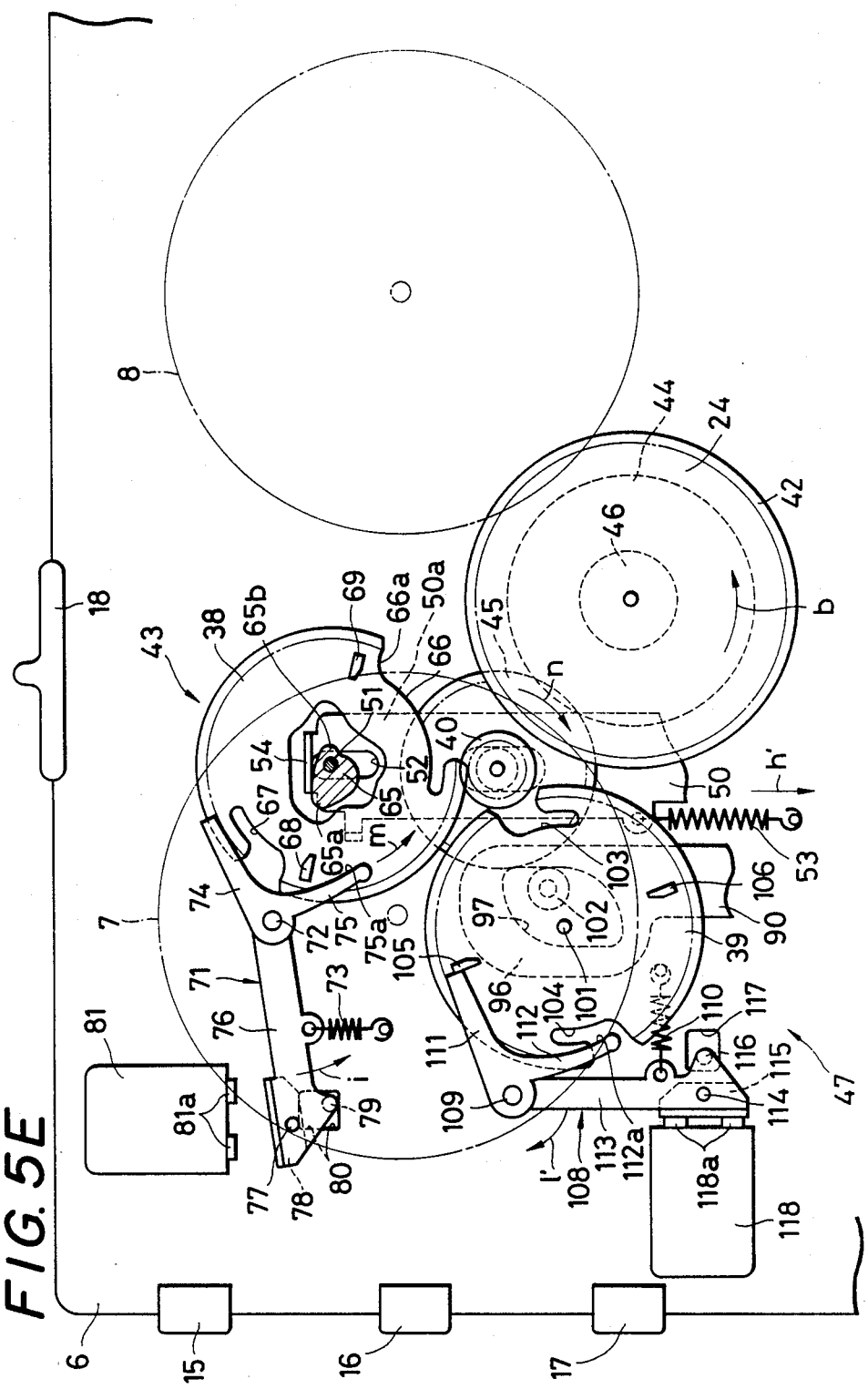

When the gear 38 is locked in the position shown on FIG. 5C and which is defined by the engagement of the arm 74 of lock lever 71 with the stop element 68, the point of contact of the cam follower 54 with the node 65a of the cam 65 is again laterally offset from the line L extending through the axis of rotation so that, when the arm 74 is disengaged from the stop element 68, as on FIG. 5D, the force of the spring 53 acting on o the driving bar 50 in the direction of the arrow h' is effective to exert a torque on the gear 38 for turning the latter in the direction of the arrow m until the peripheral teeth following the gap 66 of the gear 38 come into meshing engagement with the driving gear 40, as on FIG. 5E.

It will be noted that, in the immobile position of the gear 38 shown on FIG. 5C, that is, as defined by the engagement of stop arm 74 with stop element 68, the leading end portion 66a of the relatively long toothless portion or gap 66 is in confronting or facing relation to the driving gear 40. Accordingly, the force of the spring 53 can cause rapid or almost instantaneous turning of the gear 38 through the relatively large angular extent ₁ of the toothless portion or gap 66 as soon as arm 74 is disengaged from stop element 68 in response to the energizing of solenoid 81, as contrasted with the relatively slower angular movement of the gear 38 that results from the meshing engagement of the gear 38 with the driving gear 40.

Furthermore, when the gear 38 is locked in the position shown on FIG. 5C and at which the cam node 65a of relatively large radial extent engages the cam follower 54, the driving bar 50 is thereby disposed at the position indicated at P which corresponds to the record/playback mode of the tape recorder. More particularly, with the driving bar 50 in the position indicated at P, its lug 59 causes operative positioning of the magnetic head 13 in respect to the tape within the cassette casing 4, while the pins 60 and 61 position the supports for the pinch rollers 11 and 12 to permit one or the other of the pinch rollers, as determined by the hereinafter further described mode selecting mechanism 47, to be pressed against the respective capstan 9 or 10 for driving the tape therebetween. Further, with the driving bar 50 in its position P, the mode selecting mechanism 47 can dispose the idle gear 35 either in the position shown in full lines on FIG. 3 for causing rotation of the reel base 7 in the direction of the arrow e and thereby the tape on the reel hub 1, or in the position of the idle gear 35 shown in dot-dash lines on FIG. 3 for causing rotation of the reel base 8 in the direction of the arrow g and thereby winding the tape on the reel hub 2.

Referring again to FIG. 4, it will be seen that the idle gear 35 is rotatably mounted on one end portion of a changeover lever 83 which is mounted below the chassis 6 for swinging about an axis coaxial with the driving gear 46 so that gears 55 and 46 will remain in meshing engagement while changeover lever 83 is angularly displaced in the direction of one or the other of the arrows j and j'. By way of example, such mounting of changeover lever 83 may be achieved by engagement of a cylindrical boss on a central portion of the lever 83 within a circular hole 84 in the chassis 6. The end portion of changeover lever 83 remote from the idle gear 35 extends into the recess 55 of the driving bar 50 and has a central, longitudinally directed projection 85 engaging between the legs 58a and 58b of the hair pin spring member 58. Further, the lever 83 has splayed projections or feet 86 and 87 at opposite sides of the central projection 85 for cooperative engagement with the inwardly directed projections 56 and 57, respectively, at opposite sides of the mouth of the recess 55.

As further shown on FIG. 4, the mode selecting mechanism 47 additionally includes a changeover bar 90 extending laterally, that is, generally parallel to the foot portion 50b of the driving bar 50, and being situated between such foot portion 50b and the chassis 6. The bearings 91 and 92 for the capstans 9 and 10 project downwardly from the chassis 6 and are slidably received in elongated holes 93 and 94, respectively, formed in opposite end portions of changeover bar 90 so as to mount the latter for reciprocating movements relative to the chassis in the direction of the arrows k and k' between a position shown in full lines at F which corresponds to a forward tape running mode of the tape recorder, and a position shown in dot-dash lines at R and which corresponds t a reverse tape running mode of the tape recorder.

An actuating projection 95 extends approximately from the middle of the changeover bar 90 at the forward side of the latter and is received between the legs 58a and 58b of the hairpin wire member 58. When driving bar 50 is in the position indicated in full lines at P on FIG. 4, that is, in the position for the record/playback mode, projections 56 and 57 at the mouth of the recess 55 are moved forwardly relative to the splayed feet 86 and 87 on the lever 83 supporting the idle gear 35 so as to permit the relatively large angular displacements of lever 83 in the directions of the arrows j and j' needed to effect rotation of the reel base 7 or the reel base 8, respectively, as previously described. However, when the driving bar 50 is in the position indicated in dot-lines at S on FIG. 4, that is, in the position corresponding to the stop mode of the tape recorder, the projections 56 and 57 at the mouth of the recess 55 are moved rearwardly relative to the splayed feet 86 and 87 on lever 83 so that the projections 56 and 57 are engageable with the feet 86 and 87, respectively, to limit the angular displacements of the lever 83 from its neutral position in the directions of the arrows j' and j, respectively. In other words, with driving bar 50 in the position 5 thereof, angular displacements of the lever 83 are stopped before the idle gear 35 attains the positions shown in dot-lines and in full lines, respectively on FIG. 3 that is, before the idle gear 35 meshes with the reel base gear 31 on reel base 8 or with the intermediate gear 36 which meshes with the reel base gear 30 on reel base 7. Thus, driving of the reel base 7 or the reel base 8 through gears 46, 35 and 36 is prevented so long as driving bar 50 is in its position S corresponding to the stop mode.

However, when driving bar 50 is in its position P corresponding to the record/playback mode so that the forwardly moved projections 56 and 57 permit increased angular displacements of the lever 83, the movement of changeover bar 90 in the direction of the arrow k to its position F shown in full lines on FIG. 4 causes the actuating projection 95 to act against the leg 58a of the hairpin wire member 58 with the result that the latter is angularly displaced toward the left, as viewed on FIG. 4, whereby the leg 58b acts against the central projection 85 on the lever 83 for turning the latter in the direction of the arrow j and thereby bringing the idle gear 35 into meshing engagement with the intermediate gear 36, as shown on FIG. 3. Thus, with driving bar 50 in its position P corresponding to the record/playback mode, movement of the change over bar 90 to the position F on FIG. 4 will cause driving of the reel base 7 in the direction for winding the tape 3 on the reel hub 1.

On the other hand, if changeover bar 90 is displaced in the direction of the arrow k' to the position indicated in dot-dash lines at R on FIG. 4, while driving bar 50 remains in its position P corresponding to the record/playback mode, actuating projection 95 acts against the leg 58b of the hair pin spring member 58 for angularly displacing the latter toward the right, as viewed on FIG. 4. Such angular displacement of the spring member 58 causes the leg 58a to act against the central projection 85 of the lever 83 with the result that the latter is turned in the direction of the arrow j' so as to mesh the idle gear 35 with the reel base gear 31, as shown in broken lines on FIG. 3, for winding the tape 3 on the reel hub 2.

The changeover bar 90 further has a pair of regulating pins 98 and 99 projecting upwardly from its back edge portion to a level above that of the chassis 6 and being respectively engageable with a device (not shown) for selectively pressing the pinch roller 11 or the pinch roller 12 against the respective capstan 9 or 10, and a device (not shown) for changing the azimuth of the magnetic head 13. In other words, when changeover bar 90 is in its position F and driving bar 50 is in its position P, pinch roller 11 is pressed against the rotated capstan 9 for driving the tape run 3a past the operatively positioned head 13 in the forward direction f, with the azimuth of the head 13 being predetermined for running of the tape in such direction, while the reel base 7 is rotated in the direction of the arrow e on FIG. 3 for winding the forwardly driven tape on the reel hub 1. On the other hand, when the changeover bar 90 is moved to the position R thereof while the driving bar 50 remains in its position P, the pinch roller 12 is pressed against the respective capstan 10 for driving the tape in the reverse direction f' past the head 13 which has its azimuth suitably changed, and the reel base 8 is rotated in the direction of the arrow g on FIG. 3 for winding the tape running in the reverse direction on the reel hub 2.

The movements of the changeover bar 90 between its positions F and R are effected in response to rotation of the partially toothless gear 39, as hereinafter described in detail. More specifically, the changeover bar 90 is shown on FIG. 4 to have an integral arm 96 projecting forwardly from an end portion of bar 90 and extending between gear 39 and the chassis 6. At its forward end portion, the arm 96 has a cut-out 97 constituting a yoke cam through which there loosely extends a shaft 111 on which the gear 39 is rotatable. Further, a cam-follower roller 102 extending upwardly from gear 39 and eccentrically located in respect to the axis of such gear is received in yoke cam 97 so that, in response to rotation of gear 39, the eccentric roller 102 engages first one side edge and then the other side edge of the yoke cam 97 for moving the change over bar 90 between its positions F and R, as hereinafter described in detail.

Figure 1:
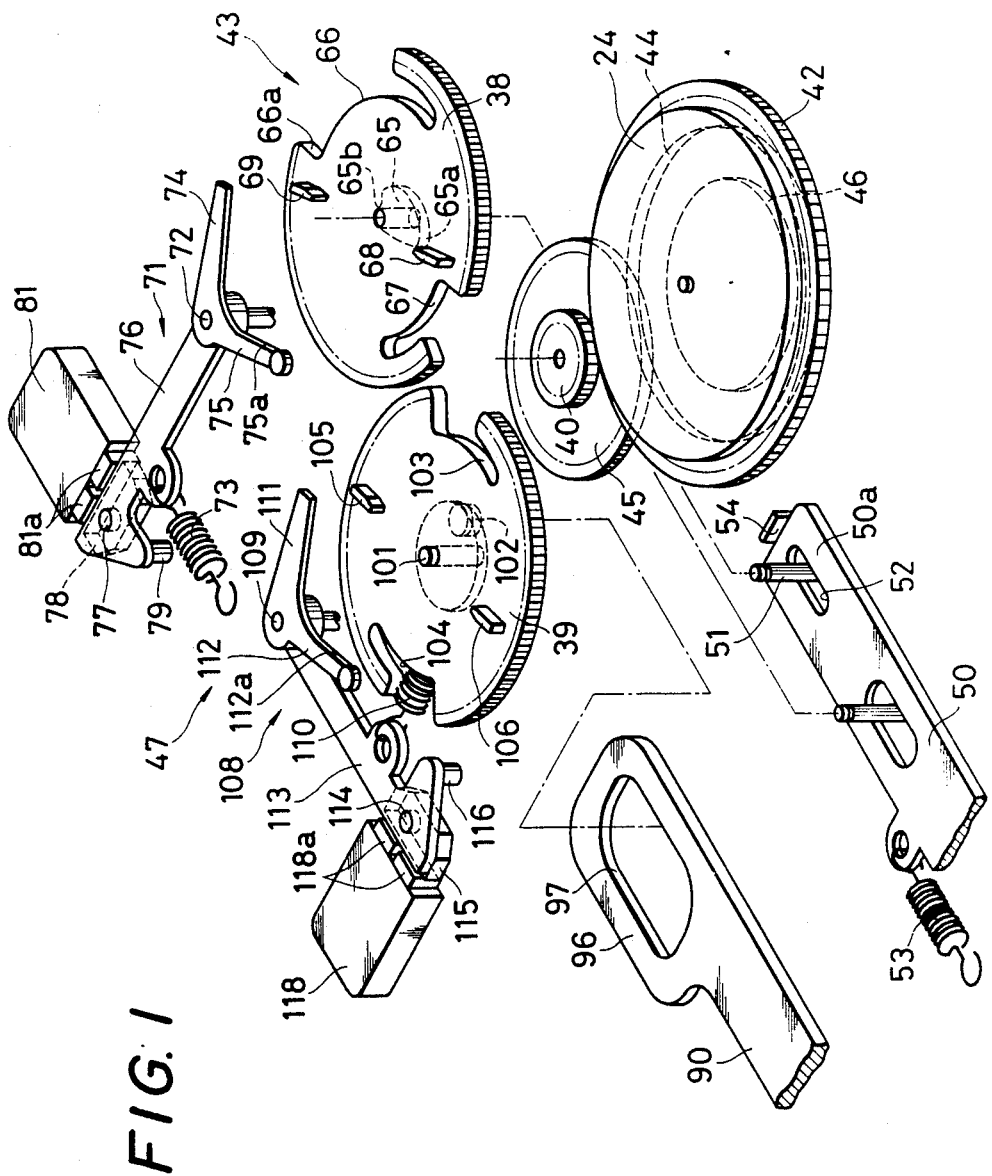
FIG. 1 is an exploded, perspective view of a major portion of a mode-change mechanism for a tape recorder in accordance with an embodiment of this invention and which is operative to effect change-over between a record/playback mode and a stop mode and between a forward tape running mode and a reverse tape running mode.

As shown particularly on FIGS. 1, 3 and 5A, the outer periphery of the gear 39 has a first toothless portion 103, which faces or confronts the driving gear 40 for establishing the forward tape running mode of the tape recorder, and outer a second toothless portion 104, which is positioned in substantially diametrical opposition to the toothless portion 103 and which confronts or faces the driving gear 40 for establishing the reverse tape running mode of the tape recorder. Further, diametrically opposed stop elements or pawls 105 and 106 are directed downwardly from the underside of the gear 39 at locations that are angularly displaced from the toothless portions 103 nd 104, respectively, by approximately 90°.

The stop elements 105 and 106 are selectively engageable by a lock lever 108 for rotationally disposing the gear 39 in immobile positions at which its toothless portions 103 and 104 respectively confront the driving gear 40. The lock lever 108 is shown to be pivoted, intermediate its ends, on a pin 109 depending from the chassis 6 and is angularly urged in the direction of the arrow 1 on FIG. 5C by means a spring 110 connected between lock lever 108 and an anchor on the chassis. The lock lever 108 is similar to the lock lever 71 in that it is also desirably molded of a synthetic resin so as to include a locking arm 111 and a resilient curved arm 112 branching from the axis of the pivot pin 109 which, in this case, is at one side of the latter, and a leg 113 at the opposite side of the pivot pin 109 and being angled in respect to the arm 111. The free end portion of the leg 113 carries a pin 114 by which an armature 115 is pivotally secured thereto, and a stop pin 116 projects from the free end portion of the leg 113 and is loosely received in a hole 117 formed in the chassis 6 for limiting the angular movements of the lock lever 108. A solenoid 118 is mounted under the chassis 6 and is provided with a permanent core magnet 118a that attracts the armature 115 with a force exceeding that of the spring 110 so as to urge lock lever 108 in the direction of the arrow 1' to the position shown on FIG. 5A so long as the solenoid 118 is deenergized. In such position of the lock lever 108, the lock arm 111 thereof projects into the circular path of movement of the stop elements 105 and 106 so as to be selectively engageable with such stop elements for holding the gear 39 in the respective immobile positions.

Upon energizing of the solenoid 118, the attraction of its permanent magnet core 118a for the armature 115 is overcome so that the spring 110 can then angularly displace the lock lever 108 in the direction of the arrow 1 on FIG. 5C to the position there shown in dot-dash lines, and in which the lock arm 111 is displaced outwardly from the axis of the gear 39 for disengaging the end of the arm 111 from the stop element 105 or 106. The resilient curved arm 112 of the lock lever 108 is shaped so that, when the lock lever 108 is in its released or disengaged position shown in dot-lines on FIG. 5C, the curving edge 112a of the arm 112 extends across the circular path of travel of the stop elements 105 and 106 with the gear 39. Thus, in the course of the rotation of the gear 3 in the direction of the arrow o on FIG. 5C, the stop element 105 or 106 which has been disengaged from the stop arm 111 moves against the curved edge 112a of the arm 112 and angularly displaces the lock lever 108 in the direction of the arrow 1' so as to again move the armature 115 against the permanent magnet core 118a of the solenoid 118. At such time, the solenoid 118 is again deenergized so that the lock lever 108 can be retained by the magnet core 118a in its operative position in which the end of the stop arm 111 is engageable by the stop element 105 or 106.

It will be understood that, when the gear 39 is locked by the engagement of stop arm 111 with stop element 105 in the rotational position where the toothless portion 103 faces the driving gear 40, the engagement of the eccentric roller 102 against one side edge of the yoke cam 97 moves the changeover bar 90 its position F shown in full lines on FIG. 4, that is, to its position corresponding to the forward tape running mode. In the course of such movement of the change-over bar 90 to its position F, the hair pin spring member 58 is flexed and, as a result thereof, a spring force acts on the changeover bar 90 in the direction of the arrow k'. Such spring force acts on the eccentric roller 102 at the contact of the latter with the edge of the cam 97 and, as shown on FIGS. 4 and 5, when stop element 105 is engaged by stop arm 111, the line of force of the edge of cam 97 against the eccentric roller 102 is offset in respect to the axis of the shaft 101. Thus, when the lock lever 108 is released from the stop element 105, the force of the spring 58 due to the flexing of the latter is applied, at the point of contact of the cam 97 with the roller 102, as a torque urging the gear 39 to turn in the direction of the arrow o on FIG. 5C, whereby, the toothed periphery is brought of the gear 39 into meshing engagement with the driving gear 40.

Similarly, when the gear 39 is locked in the position defined by the engagement of the arm 111 with the stop element 106, and in which the toothless portion 104 faces the driving gear 40, the engagement of the eccentric roller 102 with the yoke cam 97, for example, as shown in dot-dash lines on FIG. 4, is effective to move the change over bar 90 to its position R corresponding to the reverse tape running mode, and in which the hair pin spring member 58 is again flexed. When the gear 39 is locked in the position defined by the engagement of the arm 111 with the stop element 106, the point of contact of the yoke cam 97 with the roller 102 is again offset relative to the axis of the shaft 101. Therefore, when the arm 111 is disengaged from the stop element 106, the force of the flexed spring 58 acting on the change over bar 90 in the direction of the arrow k is effective to exert a torque on the gear 39 for again turning the latter in the direction of the arrow o on FIG. 5C until the peripheral teeth on the gear 39 following the toothless portion or gap 104 come into meshing engagement with the driving gear 40. The operations of the mode selecting mechanisms 43 and 47 will now be described with reference to FIGS. 4 and 5A–5E.

Starting with the mode selecting mechanisms 43 and 47 in the conditions illustrated on FIG. 5A so that the driving bar 50 is in its position S for the stop mode and the changeover bar 90 is in its position indicated at F on FIG. 4 for the forward tape running mode, the actuation of the record/playback button 15 will, as earlier indicated, cause energizing of the motor 21 so that the gears 44 and 46 are continuously rotated with the pulley 24 driven by the belt 27 and the driving gear 40 is driven by the meshing engagement of gear 45 with gear 44. Further, in response to the actuation of the button 15, the solenoid 81 is momentarily energized so that the lock lever 71 is displaced for disengaging the end of its arm 74 from the stop element 69. Upon such disengagement of arm 74 from stop element 69, the gear 38 is free to rotate and the torque exerted on the gear 38 as a result of the force of the spring 53 acting on driving bar 50 initiates turning of the gear 38 in the direction of the arrow m on FIG. 5B so as to bring the peripheral teeth following the toothless portion or gap 67 of the gear 38 into meshing engagement with the rotated driving gear 40. During the turning of the gear 38 through approximately 90° by its meshing engagement with the driving gear 40, the stop element 69 acts against the curved edge of the resilient arm 75 for gradually restoring the lock lever 71 in the direction of the arrow i' against the force of the spring 73. As a result, the armature 78 is again attracted by the permanent magnet core 81a of the solenoid 81 which is no longer energized. Thus, lock lever 71 is returned to its operative position (FIG. 5C) so as to be engageable by stop element 68 and thereby halt further rotation of the gear 38 when the latter has completed one half revolution, at which point the leading end 66a of the toothless portion or gap 66 faces the driving gear 40. Thus, the gear 38 is locked or retained in the position shown on FIG. 5C which corresponds to the record/playback mode of the tape recorder.

During the half revolution of the gear 38 in the direction of the arrow M from the position shown on FIG. 5A to the position shown on FIG. 5C, the cam 65 has moved from the position in which its relatively small node or projection 65b engages the follower 54 to the position in which the follower 54 is engaged by the relatively large node 65a of the cam. Thus, the cam 65 moves the driving bar 50 in the direction of the arrow h against the force of the spring 53 and the bar 50 finally attains its position P corresponding the record/playback mode of the tape recorder.

As earlier described, when the driving bar 50 is thus moved to its position P, the projections 56 and 57 at the opposite sides of the mouth of the recess 55 are moved away from the feet 86 and 87 of the change over lever 83. At that time, if the changeover bar 90 is disposed in its position F indicated in solid lines on FIG. 4, as has been initially assumed, the actuating projection 95 on the bar 90 can angularly displace the hair pin spring member 58 in the direction for causing its leg 58b to act against the projection 85 of the lever 83 for swinging the latter in the direction of the arrow j on FIG. 4. As a result of the foregoing, the idle gear 35 on lever 83 is meshed with the intermediate gear 36, as indicated in solid lines on FIG. 3, so that the rotation of the driving gear 46 in the direction of the arrow b is transmitted to the reel base gear 30 through the idle gear 35 and intermediate gear 36 for rotating the reel base 7 in the direction of the arrow e. Furthermore, by reason of the changeover bar 90 being in its position F, the pin 99 on bar 90 prevents the pressing of the pinch roller 12 against the respective capstan 10, and only the pinch roller 11 is urged against the capstan 9 in response to the movement of the driving bar 50 to its position P. Of course, in response to the movement of the driving bar 50 to its position P, the lug 59 thereon causes movement of the magnetic head 13 to its operative position against the tape run 3a, and the movement of the changeover bar 90 in its position F further causes the azimuth of the operative magnetic head 13 to be consistent with the driving or running of the tape in the forward direction.

Thus, a forward record or playback operation is performed by the magnetic head 13 while the capstan 9 and pinch roller 11 cooperate to drive the tape run 3a in the direction of the arrow f past the head 13, as shown on FIG. 3, and while the reel base 7 is rotated in the direction of the arrow e for winding the tape on the reel hub 1.

If the forward run/reverse run change button 17 is actuated, or if the end portion of the tape being unwound from the reel hub 2 is detected during the forward record or playback operation, the solenoid 118 is suitably momentarily energized in response thereto to overcome the attraction of the permanent magnet core 118a for the armature 115, whereby the spring 110 can angularly displace the lock lever 108 in the direction of the arrow 1 to the disengaged position shown in dot-dash lines on FIG. 5C. As a result of the foregoing, the stop element 105 is released from the stop arm 111 so that the partially toothless gear 39 is free to turn. As previously noted, at such time, an initial mechanical torque due to the force of the flexed spring 58 reacting against the changeover bar 90 is imparted to the gear 39 and causes initial turning of the latter in the direction of the arrow o on FIG. 5C.

The initial turning of the gear 39 brings peripheral teeth of the latter into meshing engagement with the rotating driving gear 40 so that the latter continues the turning of the gear 39 in the direction of the arrow o. During such turning of the gear 39 by the meshing engagement of its peripheral teeth with the driving gear 40, the stop element 105 acts against the curved edge 112a of the resilient arm 112 for gradually restoring the lock lever 108 in the direction of the arrow 1' against the force of the spring 110, whereupon the armature 115 is again attracted by the permanent magnet core 118a of the solenoid 118 which is no longer energized. Thus, lock lever 108 is returned to its operative position shown in full lines on FIG. 5C so a to be engageable, at the end of its arm 111, by the stop element 106 for halting further rotation of the gear 39 when the latter has completed one half revolution, that is, when the toothless portion or gap 104 faces the driving gear 40.

During the half revolution of the gear 39 to the position in which the stop element 106 is engaged by the arm 111 of lock lever 108, the eccentric roller 102 on the gear 39 cooperates with the yoke cam 97 for moving the changeover bar 90 in the direction of the arrow k' to the position R indicated in dot-dash lines on FIG. 4. As a result of such movement of the changeover bar 90, the actuating projection 95 thereon acts against the leg 58b of the hair pin spring member 58 for angularly displacing the latter toward the right, as viewed on FIG. 4, with the result that the spring 58 is flexed and its leg 58a acts against the central projection 85 of the lever 83 for pivoting the latter in the direction of the arrow j' on FIG. 4. Thus, the idle gear 35 meshing with the rotated gear 46 is moved to the position shown in dot-dash lines on FIG. 3 for meshing engagement with the reel base gear 31, whereby the reel base 8 is rotated in the direction of the arrow g for winding the tape on the reel hub 2. Furthermore, by reason of the changeover bar 90 being moved to its position R on FIG. 4, the pin 99 on bar 90 prevents the pressing of the pinch roller 11 against the respective capstan 9, and only the pinch roller 12 is urged against the capstan 10 for driving the tape run 3a in the reverse running direction indicated by the arrow f' on FIG. 3. Furthermore, the movement of the changeover bar 90 to its position R changes the azimuth of the operative magnetic head 13 to be consistent with the driving or running of the tape in the reverse direction. Thus, the reverse record or playback mode is obtained.

If the forward run/reverse run change button 17 is actuated or if the end portion of the tape being unwound from the reel hub 1 is detected during the reverse record or playback operation, the solenoid 118 is again momentarily energized to disengage the lock lever 108 from the stop element 106 and thereby permit turning of the gear 39 through another half revolution back to the immobile position in which the stop element 105 engages the arm 111 of lock lever 108 and the changeover bar 90 is moved to its position F shown in full lines on FIG. 4 for restoring the forward tape running mode. Thus, the record or playback mode with the tape being run in the forward direction is restored in response to the movement of the changeover bar 90 to its position F at which the azimuth of the magnetic head 13 is also adjusted for correspondence to the forward tape running direction.

Preferably, suitable detecting switches (not shown) may be associated with the driving bar 50 and the changeover bar 90 for indicating, from the positions of the respective bars 50 and 90, when the tape recorder is in its record/playback mode or stop mode, and further for indicating the tape running direction in the record/playback mode.

If the stop button 16 is actuated while the tape recorder is in its forward record/playback mode or in its reverse record/playback mode, the solenoid 81 is momentarily energized so as to cause disengagement of the lock lever 71 from the stop element 68, as shown on FIG. 5D. As a result, the gear 38 is free to turn and the force of the spring 53 acting on the driving bar 50 in the direction of the arrow h' is effective to exert a torque on the gear 38 for turning the latter in the direction of the arrow m until the peripheral teeth following the gap 66 of the gear 38 come into meshing engagement with the driving gear 40, as on FIG. 5E. Due to the relatively large angular extent of the toothless portion or gap 66, the turning of the gear 38 from the position shown on FIG. 5C to the position shown on FIG. 5E is effected rapidly under the influence of the spring 53 and permits displacement of the driving bar 50 in the direction of the arrow h' to its position S for changeover from the record/playback mode to the stop mode. Thus, actual stopping of the recording or playback operation of the tape recorder is effected almost instantaneously upon the actuation of the stop button 16. Of course, after the gear 38 attains the position shown on FIG. 5E, the meshing engagement with the driving gear 40 of the peripheral teeth of the gear 38 following the gap 66 causes further relatively slower turning of the gear 38 to the position shown on FIG. 5A in which the stop element 69 is engaged by the lock lever 71 for holding the gear 38 in the immobile position in which the gap or toothless portion 67 faces the driving gear 40.

The rapid movement of the driving bar 50 to its position S causes the projects 56 and 57 at the mouth of the recess 55 to selectively act on the legs 86 and 87, respectively, of the lever 83 for returning the latter to a neutral position in which idle gear 35 is spaced from intermediate gear 36 and also from reel base gear 31. Thus, the driving of reel base 7 or 8 is halted even though the changeover bar 90 is positioned to select the forward tape running mode or the reverse tape running mode. Further, in response to the rapid movement of the driving bar 50 to its position S, the leg 59 thereon causes return of the magnetic head 13 to its inoperative position, and the pins 60 and 61 cause both pinch rollers 11 and 12 to be spaced from the respective capstans 9 and 10.

Moreover, by reason of the above described rapid or almost instantaneous change from the record/playback mode to the stop mode, damaged to the tape or to the tape recorder can be avoided even if the fast forward/rewind switch 18 is actuated while the tape recorder is in its record/playback mode. More specifically, if the fast forward/rewind switch 18 is actuated at a time when the tape recorder is detected to be in its record/playback mode, as earlier indicated, an electric current is instantaneously supplied to the solenoid 81 for momentarily energizing the latter. As a result of the foregoing, the gear 38 is free to be rotated by the force of the spring 53 from the position shown on FIG. 5C, that is, the position of gear 38 corresponding to the record/playback mode, with the result that the driving bar 50 is substantially immediately moved to its position S corresponding to the stop mode. As earlier noted and as shown in dot-dash lines on FIG. 4, the return of the driving bar 50 to its position S causes the projections 56 and 57 to selectively act on the legs 86 and 87, respectively, of the lever 83 for returning the lever 83 to a neutral position, that is, a position in which idle gear 35 is out of meshing engagement with both the intermediate gear 36 and the reel base gear 31. As a result of the foregoing, the potential for simultaneous driving of the reel base gear 30 from the driving gear 46 through the gears 35 and 36 and from the driving gear 42 through the gears 33 and 34, and the potential for simultaneous driving or of the reel base gear 31 from the driving gear 46 through the gear 35 and from the driving gear 42 through the gear 33 are eliminated.

Although the angular extent $_1$ of the toothless portion or gap 66 of the gear 38 is preferably made larger than the angular extent $_2$ of the other toothless portion or gap 67 for the reason given above, the angular extent $_1$ of the gap 66 cannot be made too large. More particularly, the angular extent $_1$ of the gap 66 should not be substantially exceed 90° in order to ensure the timely return of the lock lever 71 to its operative position for engagement of the end of the stop arm 74 with the stop element 69 when the gear 38 has returned to its immobile position shown on FIG. 5A, that is, the position corresponding to the stop mode of the tape recorder. By reason of the foregoing limitation on the angular extent $_1$ of the toothless portion or gap 66, the peripheral teeth on the gear 38 following the gap 66 come into meshing engagement with the driving gear 40, and thereby relatively slow the rotational movement of the gear 38, before the stop element 68 comes into sliding engagement with the curved edge 75a of the resilient arm 75. Thus, during the engagement of the driving gear 40 with the peripheral teeth of gear 38 following the gap 66, the action of stop element 68 on resilient arm 75 surely returns the lock lever 71 to its operative position for engagement of the end of stop arm 74 with stop element 69 upon the return of gear 38 to its position corresponding to the stop mode.

It will be appreciated that a tape recorder provided with the above described mode change mechanism according to this invention may be suitably programmed for operation according to a "one reciprocation" mode or according to a "successive reciprocations" mode. When the "one reciprocation" mode is selected, the record or playback operation proceeds automatically first with the tape running in the forward direction from the reel 2 to the reel 1, and then with the tape running in the reverse direction from the reel 1 back to the reel 2. Upon detection of the end portion of the tape unwound from the reel 1 with the tape being run in the reverse direction, the gear 38 is automatically turned through a half revolution from the position shown on FIG. 5C to the position shown on FIG. 5A so that the stop mode is then obtained or previously described. In the "successive reciprocation" mode, the tape 3 is made to run alternately in the forward and reverse directions indefinitely, that is, until the stop mode is selected by actuation of the switch 16. Thus, in the "successive reciprocations" mode, upon detection of the end portion of the tape being unwound from the reel 2 or from the reel 1 when the tape is running in the forward or reverse direction, respectively, the gear 39 is turned through a half revolution, in the manner previously described, so as to change the direction in which the tape is being made to run.

In the above described embodiment of the invention wherein the angular ranges $_1$ and $_2$ of the toothless portions or gaps 66 and 67 of the gear 38 are different from each other, the return spring 53 for returning the driving bar 50 to its position S corresponding to the stop mode is also utilized to provide the force or torque for initially urging the gear 38 to turn when the lock lever 71 is disengaged from the stop element 68 or 69. Such arrangement obviously simplifies the construction of the mode change mechanism. However, if desired, individual springs may be provided for imparting the initial torque to the gear 38 and for urging the driving bar 50 back to its position S.

It is also to be noted that, in a tape recorder having a mode-change mechanism according to the described embodiment of the invention, the first partially toothless gear 38 for controlling the driving bar 50 by which the record/playback mode and the stop mode are selectively established, the second partially toothless gear 39 for controlling the changeover bar 90 by which the forward tape running mode and the reverse tape running mode are selectively established, and the driving gears 42 and 46 from which the reel bases 7 and 8 are selectively driven are substantially equally spaced from each other and in surrounding relation to the driving gear 40. Further, the partially toothless gears 38 and 39 are intermittently and selectively driven by the same driving gear 40, with the result that the gears for selectively driving the reel bases 7 and 8, and the gears for changing the modes of the tape recorder can all be accommodated in a very small space.

Although an illustrative embodiment of this invention has been described in detail herein with reference to the accompanying drawings, it is to be understood that tee invention is not limited to that precise embodiment, and that various changes and modifications may be effected therein by one skilled in the art without departing from the scope or spirit of the invention as defined in the appended claims.

What is claimed is:

1. A mode-change mechanism for a tape recorder comprising:
    a chassis;
    a driving bar mounted on said chassis form movement between a first position and a second position for establishing a record/playback mode and a stop mode, respectively, of the tape recorder, said driving bar having a cam follower thereon;
    a partially toothless gear rotatable on said chassis and having a first toothless portion and a second toothless portion spaced apart on the outer periphery thereof, a cam rotatable with said gear and including a first projection and a second projection engageable with said cam follower for moving said driving bar between said first position and said second position in response to turning of said partially toothless gear, and first and second stop elements spaced apart on said partially toothless gear, said first toothless portion having an end facing said driving gear in correspondence to said first position of the driving bar and having a length substantially greater than the length of said second toothless portion;
    a driving gear for intermittently rotating said partially toothless gear;
    a lock lever selectively engageable with one of said first and second stop elements when said partially toothless gear is rotationally disposed with said first toothless portion or said second toothless portion, respectively, facing said driving gear so as to halt rotation of said partially toothless gear in a respective immobile position thereof, said first stop element being positioned so that, when the latter is engaged by said lock lever, said end of said first toothless portion is adjacent said driving gear for permitting substantially instantaneous change-over from said record/playback mod to said stop mode with turning of said partially toothless gear free of said driving gear when said lock lever is disengaged form said first stop element;
    a solenoid energizable for disengaging said lock lever from said record/playback mode to said stop mode urging means for urging said driving bar toward one of said first and second positions thereof and thereby pressing said cam follower against said cam;
    said first and second projections of the cam, said first and second toothless portions of the partially toothless gear and said first and second stop elements being angularly positioned in respect to each other so that, when said solenoid is energized to disengage said lock lever from either one of said first and second stop elements, the pressing of said cam follower against the respective one of said first and second projections of the cam by the force of said urging means is effective to initiate turning of said partially toothless gear from the respective immobile position in a direction to move the respective one of said toothless portions past said driving gear and to achieve meshing engagement of said partially toothless gear with said driving gear.

2. A mode-change mechanism for a tape recorder according to claim 1; wherein said driving bar has means thereon for controlling the positioning of a record/playback head, for determining the engagement of pinch rollers with respective capstans and for controlling the driving of a pair of reel bases in accordance with said first and second positions of the driving bar.

3. A mode-change mechanism for a tape recorder according to claim 2; wherein said urging means is connected between said driving bar and said chassis so as to urge said driving bar toward said second position for establishing the stop mode.

4. A mode-change mechanism for a tape recorder according to claim 1; wherein said driving bar is movable along a straight line between said first and second positions, and said first and second projections of the cam are disposed in respective to said first and second toothless portions and said first and second stop elements so that, with said partially toothless gear in each said immobile position thereof, said cam follower acts on a respective one of said first and second projections of the cam at a point of contact offset laterally in one direction from a straight line passing through the center of rotation of said partially toothless gear parallel with said straight line along which said driving bar is movable.

5. A mode-change mechanism for tape recorder according to claim 1; wherein said end of said first toothless portion, said first stop element and said first projection on the cam are substantially diametrically opposed from an end of said second toothless portions, said second stop element and said second projection on the cam, respectively, in respect to the axis of rotation of said partially toothless gear.

6. A mode-change mechanism for a tape recorder according to claim 1; wherein said first projection and said second projection of the cam project different radial distances from the axis of rotation of the partially toothless gear.

7. A mode-change mechanism for a tape recorder comprising:
- a chassis;
- a driving bar mounted on said chassis for movement between a first position and a second position for establishing a record/playback mode and a stop mode, respectively;
- means on said driving bar for controlling the positioning of a recorder/playback head, for determining the engagement of pinch rollers with respective capstans and for controlling the driving of a pair or reel bases in accordance with said first and second position of the driving bar;
- a partially toothless gear rotatable on said chassis and having a first relatively long toothless portion and a second relatively short toothless portion spaced apart on the outer periphery thereof, a cam rotatable with said gear and including a first projection and a second projection selectively engageable with said driving bar for moving said driving bar between said first position and said second position in response to turning of said partially toothless gear, an first and second stop elements spaced apart on said partially toothless gear;
- a driving gear for intermittently rotating said partially toothless gear;
- a lock lever selectively engageable with one of said first and second stop elements when said partially toothless gear is rotationally disposed with an end of said first toothless portion or said second toothless portion, respectively, facing said driving gear so as to halt rotation position thereof;
- a solenoid energizable for disengaging said lock lever from the selected one of said stop elements; and
- urging means for biasing said driving bar to one of said first and second position thereof and into engagement with said first and second projections, respectively, of the cam;
- said first and second projections of the cam, said first and second toothless portions of the partially toothless gear and said first and second stop elements being angularly positioned in respect to each other so that, when said solenoid is energized to disengage said lock lever from either one of said first and second stop elements, the pressing of said driving bar against the respective one of said first and second projections of the cam by the force of said urging means is effective to initiate turning of said partially toothless gear from the respective toothless portion past the driving gear and to achieve initial meshing engagement with said driving gear.

8. A mode-change mechanism for a tape recorder according to claim 7; further comprising a change-over bar mounted on said chassis for movement between a first position and a second position respectively corresponding to forward and reverse tape running directions;
- a second partially toothless gear rotatable on said chassis and having a first toothless portion and a second toothless portion spaced apart on the outer periphery thereof, cooperative cam means on said change-over bar and said second partially toothless gear for moving said change-over bar between said first and second positions thereof, and first and second stop elements spaced apart on said second partially toothless gear;
- a second lock lever selectively engageable with one of said first and second stop elements on said second partially toothless gear when the latter is rotationally disposed with said first and second toothless portions, respectively, of said second partially toothless gear facing said driving gear so as to halt rotation of said second partially toothless gear in a respective immobile position thereof;
- a second solenoid energizeable for disengaging said second lock lever from the selected one of said stop elements on said second partially toothless gear; and
- second urging means for effecting initial turning of said second partially toothless gear from each said immobile position of the latter upon disengaging of said second lock lever so as to attain meshing engagement of said second partially toothless gear with said driving gear.

9. A mode-change mechanism for a tape recorder according to claim 8, wherein said change-over bar has means thereon for controlling the azimuth of said record/playback head and for selecting the one of said pinch rollers to be pressed against the respective capstan in accordance with said forward and reverse tape running mode positions, respectively.

* * * * *